E. & B. STARCH.
MILKING MACHINE.
APPLICATION FILED NOV. 16, 1914.

1,269,015.

Patented June 11, 1918.
2 SHEETS—SHEET 1.

Witnesses:
John Enders
Mildred Stumpf

Inventors:
Emil Starch &
Benjamin Starch
by Fred Gerlach
his Atty.

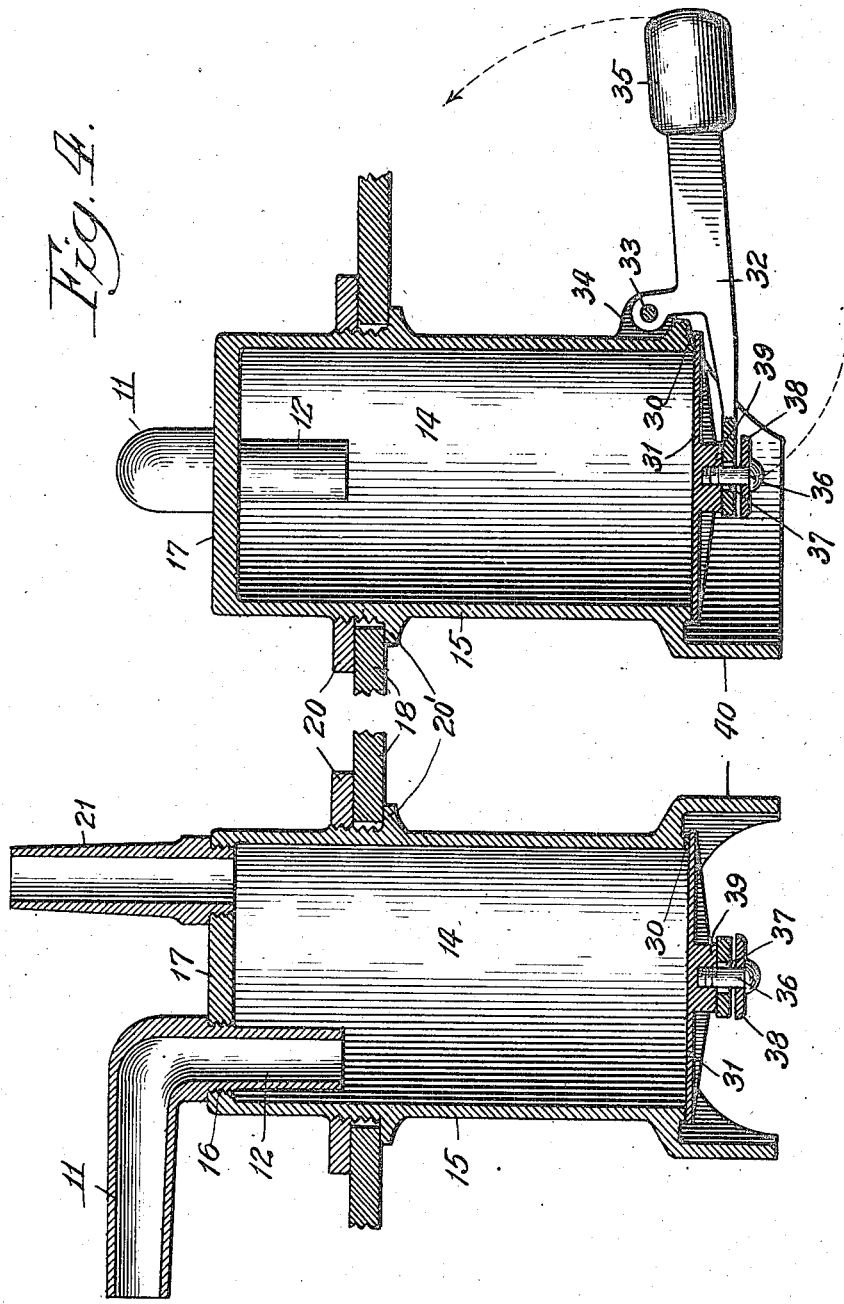

UNITED STATES PATENT OFFICE.

EMIL STARCH AND BENJAMIN STARCH, OF LA CROSSE, WISCONSIN.

MILKING-MACHINE.

1,269,015.        Specification of Letters Patent.        Patented June 11, 1918.

Application filed November 16, 1914. Serial No. 872,284.

*To all whom it may concern:*

Be it known that we, EMIL STARCH and BENJAMIN STARCH, residents of La Crosse, county of La Crosse, and State of Wisconsin, have invented new and useful Improvements in Milking-Machines, of which the following is a full, clear, and exact description.

The invention relates to milking machines. The object of the invention is to provide an improved milking machine which is simple in construction, sanitary and efficient in operation.

The invention consists in the several novel features hereinafter set forth and more particularly defined by claims at the conclusion hereof.

Figure 2:
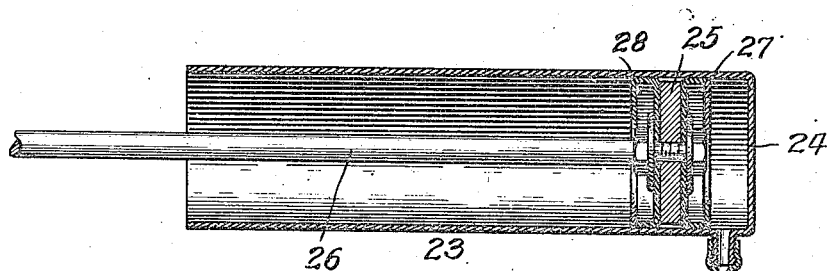
Figure 2:
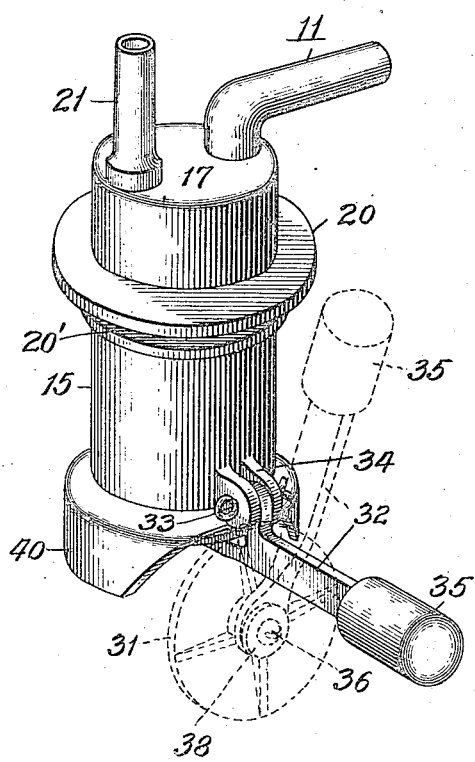
Figure 1:
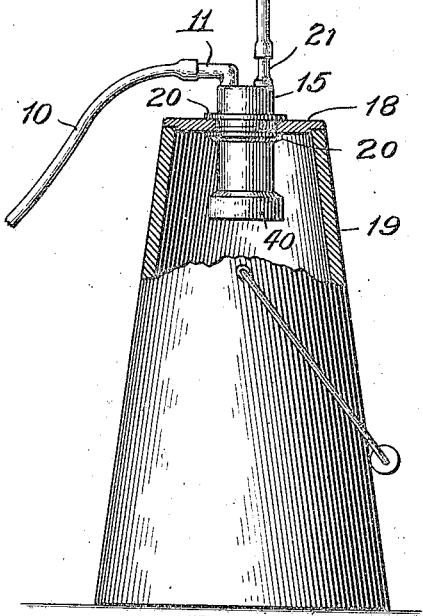

In the drawings: Figure 1 is a section of a milking apparatus embodying the invention. Fig. 2 is a perspective of the casing containing the milk chamber, into which the milk is drawn by suction and then discharged into a suitable receptacle. Figs. 3 and 4 are sections of the casing containing the milk chamber.

10 denotes a flexible pipe which is usually connected to the teat-cups, in manner well understood in the art, and is connected to an elbow fitting comprising a horizontally disposed nipple 11 and a vertically disposed nipple 12 which extends downwardly into the milk-chamber 14 which is formed in a casing 15. This elbow is screw-threaded, as at 16, into the top 17 of casing 15 so it can be readily removed to be washed. Casing 15 is adapted to be held on the top 18 of a milk pail 19 by a ring 20 which is screw-threaded to the casing; a shoulder 20' being formed on the casing for engaging the under side of top 18. A nipple 21 is screw-threaded into the top 17 of the casing and a pipe 22 is connected to said nipple and to a pump 23. The terminal of nipple 12 is disposed below the point where nipple 21 opens into the milk chamber, so that no milk will pass to the pump. This pump 23 comprises a cylinder 24, a piston 25 and a piston rod 26, to which movement may be imparted by any means known in the art.

A characteristic of this pump is, that the piston is double acting, being provided with oppositely facing cup-shaped packing-rings 27 and 28, so that the pump will act both to exhaust air from the milk chamber and to force it through the milk chamber, the exhausting of the air serving to draw the milk from the teat-cups into the milk-chamber, and the forcing of the air back through the chamber being utilized to discharge the milk from chamber 14 into the pail 19.

At its lower end, casing 15 is open and is provided with an annular valve-seat 30. Cup 15 is in the form of an inverted cup and its bottom is wholly opened so that there is no restriction of the milk discharge, and so that the casing can be easily washed. A disk-valve 31 is adapted to fit against seat 30 to close the lower end of the casing and this valve is carried by a lever 32 which is pivoted, as at 33, to lugs 34 projecting from the lower portion of casing 15 and is provided with a weight 35 which is adapted to lift the valve 31 against the weight of the milk in the chamber and hold the valve closed during the entire exhaust stroke of the pump. Valve 31 is connected to the inner end of lever 32 by a screw 36 which passes loosely through a hole 37 in the lever and is provided with a washer 38. Lever 32 fits loosely between washer 38 and a shoulder 39 on the valve, so that the valve will be free to adjust itself to the valve seat when acted upon by the lever. A pendant guard flange 40 is formed on casing 15 to deflect the milk which may be discharged laterally between the lower end of the casing and the valve, so that the milk will be directed downwardly into the pail 19.

In operation, during each out-stroke of piston 25 a partial vacuum will be created in the milk chamber to draw the milk from the teat-cups through pipe 10 and into the milk-chamber 14. Elbow 11, 12 will direct the milk downwardly in said chamber, so that it will not be drawn upwardly through the nipple 21 to the pump. During each suction stroke of the pump, valve 31 will be held closed by lever 32 and weight 35, the latter having sufficient force to overcome the weight of the milk in the milk-chamber and thus insure effective closure of the valve during the entire suction stroke of the pump. During each in-stroke of piston 25, air will be forced from the pump-cylinder through pipe 22 into the milk-chamber 14 and this force will be sufficient, with the weight of the milk in the chamber, to overcome the force of lever 32 and weight 35 and cause valve 31 to be unseated. Thereupon, the milk in chamber 14 will be instantly and quickly discharged into the pail 19. This operation will continue as long as the pump is operated.

A characteristic of the invention is, that pressure of air in the milk chamber serves to open the outlet valve 31 and to force the milk from the milk-chamber, which results in effectively discharging all of the milk in the chamber during each alternate stroke of the pump piston. A further characteristic of the invention is that the casing, having no restricted or offset discharge opening, may be very readily washed and wiped out. Nipples 11, 12 and 21 may also be disconnected from the casing and thoroughly washed when desired.

In practice, it has been found that the milking device set forth is efficient in operation and is sanitary. It is simple in construction and can be produced at a low cost.

The invention is not to be understood as restricted to the details set forth, since these may be modified within the scope of the appended claims, without departing from the spirit and scope of the invention.

Having thus described our invention, what we claim as new, and desire to secure by Letters Patent, is:—

1. In milking apparatus, a chamber having its lower end open and provided at said end with a downwardly facing valve seat, a milk inlet pipe connected to said chamber, a reciprocating pump connected to said chamber, a counterweighted valve disposed outside of said chamber and adapted to close the lower end thereof, said counterweight acting in conjunction with the suction stroke of said pump to maintain said valve closed, and a depending flange on the chamber for directing the discharge downward.

2. In milking apparatus, the combination of a casing having an integral top and provided with a discharge opening, a valve for closing said opening, a pump, a connection between the pump and the casing, and an inlet pipe extending through the top of the casing and into the milk chamber to a point below the connection for the pump.

3. In milking apparatus, the combination of an inverted, cup-shaped casing having an integral top and having its lower end open, a downwardly opening valve for closing said open end, an inlet connection comprising a nipple removably secured in the top of the casing, a pump, and a connection between the pump and the casing comprising a nipple removably secured in the top of the casing.

4. In milking apparatus, a casing, means for admitting milk thereto and for discharging the same therefrom, an exterior shoulder formed annularly on said casing, and a ring adapted for screw-threaded engagement with said casing above said shoulder, whereby to clamp therebetween the edge of a support.

EMIL STARCH.
BEN. STARCH.

Witnesses:
A. P. PARSONS,
C. B. STEVENS.